United States Patent

Zhang et al.

[11] Patent Number: 6,055,310
[45] Date of Patent: Apr. 25, 2000

[54] PHASE REVERSAL TONE DETECTOR USING DSP

[75] Inventors: Naigang Zhang, Nepean; Quentin Meek, Gloucester, both of Canada

[73] Assignee: Nortel Networks Corporation, Montreal, Canada

[21] Appl. No.: 08/992,581

[22] Filed: Dec. 17, 1997

[51] Int. Cl.[7] .................................................. H04M 1/00
[52] U.S. Cl. .......................... 379/407; 379/410; 379/411; 379/406
[58] Field of Search .................................... 379/407, 406, 379/410

[56] References Cited

U.S. PATENT DOCUMENTS

| | | | |
|---|---|---|---|
| 4,658,420 | 4/1987 | Fukushi et al. | 379/407 |
| 4,836,675 | 6/1989 | Hendow et al. | 356/350 |
| 5,029,204 | 7/1991 | Shenoi et al. | 379/407 |
| 5,418,778 | 5/1995 | Cummiskey et al. | 370/32.1 |
| 5,420,921 | 5/1995 | Lähdemäki et al. | 379/407 |
| 5,625,684 | 4/1997 | Matouk et al. | 379/387 |
| 5,748,752 | 5/1998 | Reames | 381/94.1 |

OTHER PUBLICATIONS

"A Simple Phase–Reversal Tone Disabler" ICASSP 86, Tokyo, 1986 by Melsa et al. (pp. 2619–2622).

*Primary Examiner*—Forester W. Isen
*Assistant Examiner*—Brian Tyrone Pendleton

[57] ABSTRACT

Apparatus to permit recognition of a G.165 sampled tone to allow for disabling an echo canceller determines a phase change in the sampled tone. The apparatus comprises a FIFO buffer which receives an input sampled tone and temporarily stores samples from the input sampled tone on a FIFO basis presenting a delayed sampled tone to an adaptive filter core. The core is also input by the input sampled tone. The adaptive filter core introduces a variable delay to the delayed sampled tone such that a phase difference between the input sampled tone and the output of the adaptive filter core iteratively achieves an integer multiple of $2\pi$. The apparatus includes a filter freezer for, after the phase difference achieves a multiple of $2\pi$, freezing the adaptive filter such that the adaptive filter the delay in the signal imposed by the adaptive filter is set regardless of any phase difference thereafter arising between the input sampled tone and the output of said adaptive filter core. A monitor then monitors the input sampled tone and the output of the frozen adaptive filter for a phase change.

14 Claims, 4 Drawing Sheets

PHASE REVERSAL TONE DETECTOR USING DSP

FIELD OF THE INVENTION

This invention relates to a method and apparatus for determining a phase change in a tone (i.e., a constant single frequency signal).

BACKGROUND OF THE INVENTION

Long distance telecommunications requires amplification and often involves multiplexing. These operations are facilitated if the two directions of transmission are isolated from one another. Isolation is obtained by providing four wires: two for transmission in each direction. While long distance lines are generally implemented over four wire lines, virtually all subscriber loops are implemented with a single pair of wires which carries transmissions in both directions. Hybrid circuits are provided to allow interconnection of four wire trunks with two-wire lines. If the impedance of the two-wire line matches that of the four-wire line, all energy incoming to the two-wire line from the four-wire line is coupled to the two-wire line and none is reflected back on the four-wire line as an echo. However, circuits are generally switched connections so that the impedance changes with each connection. Because of this, echoes on the four-wire line are a problem. To control echoes, echo cancellers are employed. An echo canceller is positioned at the hybrid circuit and subtracts a properly delayed and attenuated copy of a signal received from the far end of the four-wire line from the signal propagating from the near end of the four-wire line at the hybrid circuit back toward the far end of the line in order to cancel echo components.

An echo canceller, while invaluable for voice communications, may destroy data in full duplex data communications. Consequently, it is desirable to disable an echo canceller in a circuit during data communications. To facilitate this, "called" modems are designed to generate an answer tone (i.e., a constant single frequency signal) at the start of their transmissions. The International Telecommunications Union (ITU) developed two standards in this regard: the G.164 standard and the more recent G.165 standard, which is the currently recommended standard for echo cancellers. Both standards require that disabling occur where a received tone falls between 2079 Hz and 2121 Hz at a signal level of between −31 dBm and 0 dBm and further indicate that a disabling circuit would meet the standard if it disabled an echo canceller on tones in the band 1900 Hz to 2350 Hz. Both standards require proper operation down to a signal to noise ratio of 11 dB. Under the G.164 standard, a disabler may validate a tone of appropriate frequency and level after 300+/−100 ms. Modems designed in accordance with the G.165 standard reverse the phase of their tone every 450 ms +/−25 ms. To meet the standard, a disabling circuit must recognize a phase variation in the range of 180°+/−25° while phase variations in the range of 0°+/−110° must not be detected.

U.S. Pat. No. 4,658,420 describes an echo canceller disabler which recognizes phase reversing tones. The disabler includes a tone detector and a separate reverse phase detector. The reverse phase detector comprises a wave shaping circuit for converting the received tone to a rectangular wave, a delay circuit, an inverter, and an EXOR circuit responsive to the output of the inverter and the wave shaping circuit. The delay circuit introduces a fixed delay so as to permit detection of a phase reversing 2100 Hz tone. If the tone received is of a different frequency, the detector may fail to recognize the phase reversal.

This invention seeks to provide a phase reversal detecting disabler using digital signal processing (DSP) techniques to detect phase reversals with a high degree of accuracy.

SUMMARY OF THE INVENTION

In accordance with this invention, there is provided a method for determining a phase change in a sampled tone, comprising the steps of: delaying an input sampled tone by a variable amount to obtain an output sampled tone until a phase of said output sampled tone is an integer multiple of $2\pi$ of said input sampled tone; when said phase of said output sampled tone is an integer multiple of $2\pi$ of said input sampled tone, fixing said variable delay regardless of any phase difference thereafter arising between said input sampled tone and said output sampled tone; and thereafter monitoring said input sampled tone and said output sampled tone for a phase difference arising between said input sampled tone and said output sampled tone, said arising phase difference indicating a phase change in said sampled tone.

In accordance with another aspect of this invention, there is provided apparatus for determining a phase change in a sampled tone, comprising: a fixed length first in first out (FIFO) buffer input by said sampled tone for temporarily storing a plurality of sampled signals on a FIFO basis and presenting a delayed sampled tone at a FIFO buffer output; an adaptive filter input by said FIFO buffer output and by said input sampled tone for introducing a variable delay in said delayed sampled tone and presenting an output sampled tone at an adaptive filter output until a phase difference between said input sampled tone and said output of said adaptive filter is an integer multiple of $2\pi$; a filter freezer for, after said phase difference becomes an integer multiple of $2\pi$, freezing said adaptive filter such that said adaptive filter maintains a fixed delay regardless of any phase difference thereafter arising between said input sampled tone and said output of said adaptive filter; and a monitor for monitoring said input sampled tone and said output of said frozen adaptive filter for a phase difference arising between said input sampled tone and said output of said frozen adaptive filter, said arising phase difference indicating a phase change in said sampled tone.

BRIEF DESCRIPTION OF THE DRAWINGS

In the drawings which illustrate embodiments of this invention.

DETAILED DESCRIPTION OF THE PREFERRED EMBODIMENTS

Figure 1:
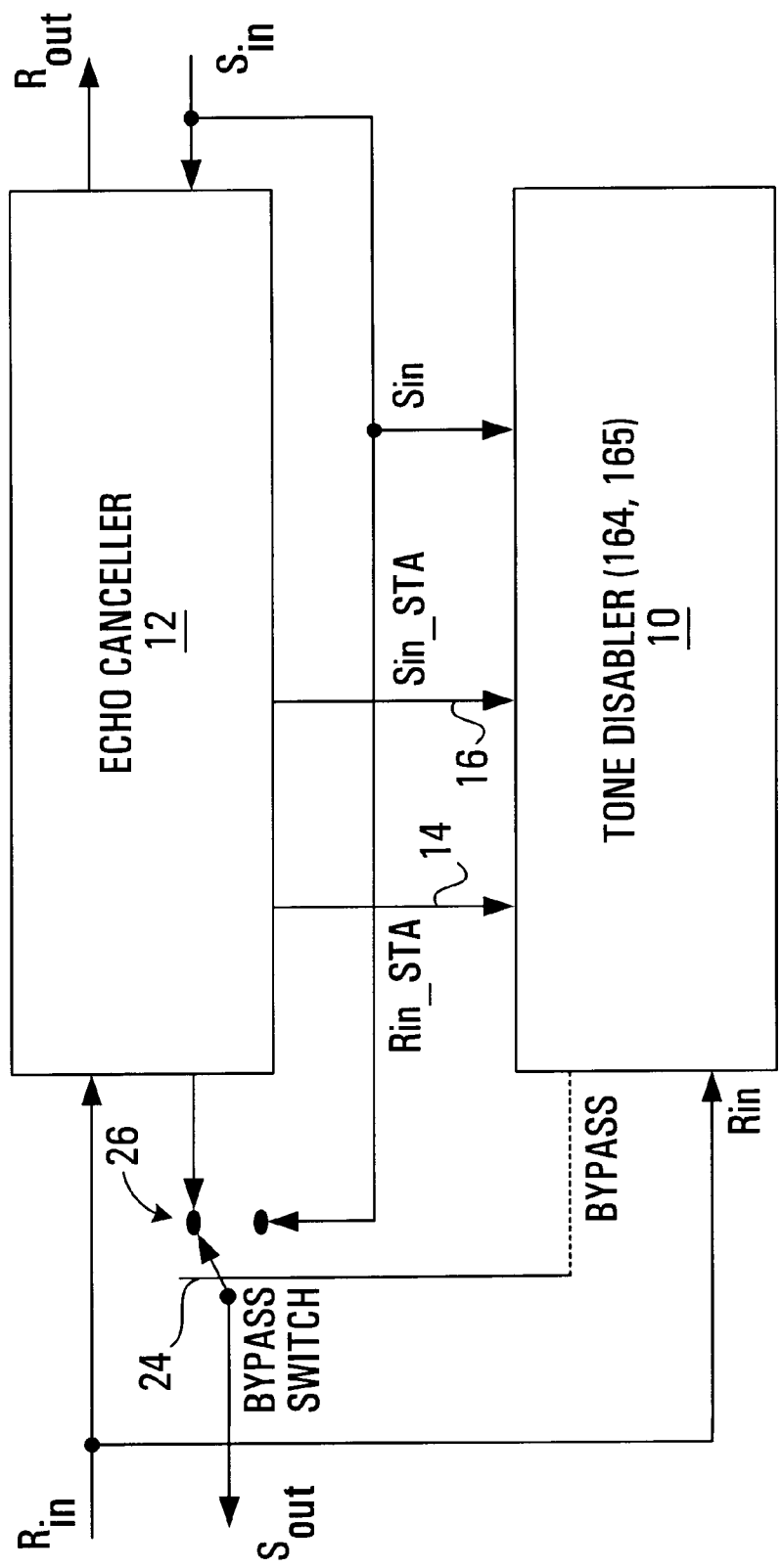
FIG. 1 is a schematic view of an echo canceller with a tone disabler made in accordance with this invention.

Turning to FIG. 1, a tone disabler 10 is associated with an echo canceller 12. The echo canceller and the tone disabler receive a receive signal $R_{in}$, from the far end of the line and a send signal, $S_{in}$, from the near end of the line. When enabled, the echo canceller subtracts an attenuated and delayed version of $R_{in}$ from $S_{in}$ so that the send signal leaving the echo canceller for the far end, $S_{out}$, has echo components removed.

The echo canceller outputs a signal $R_{in}$_STA on line 14 and a signal $S_{in}$_STA on line 16 to the tone disabler.

$R_{in}$_STA is representative of the short term running average (STA) level of the signal $R_{in}$ received from the far end and $S_{in}$_STA is representative of the short term running average of the level of the signal $S_{in}$ received from the near end. The tone disabler 10 outputs on a control line 24 for operating bypass switch 26 in order to selectively have the signal, S, from the near end by-pass the echo canceller. With the signal from the near end by-passing the echo canceller, the canceller is disabled.

Figure 2:
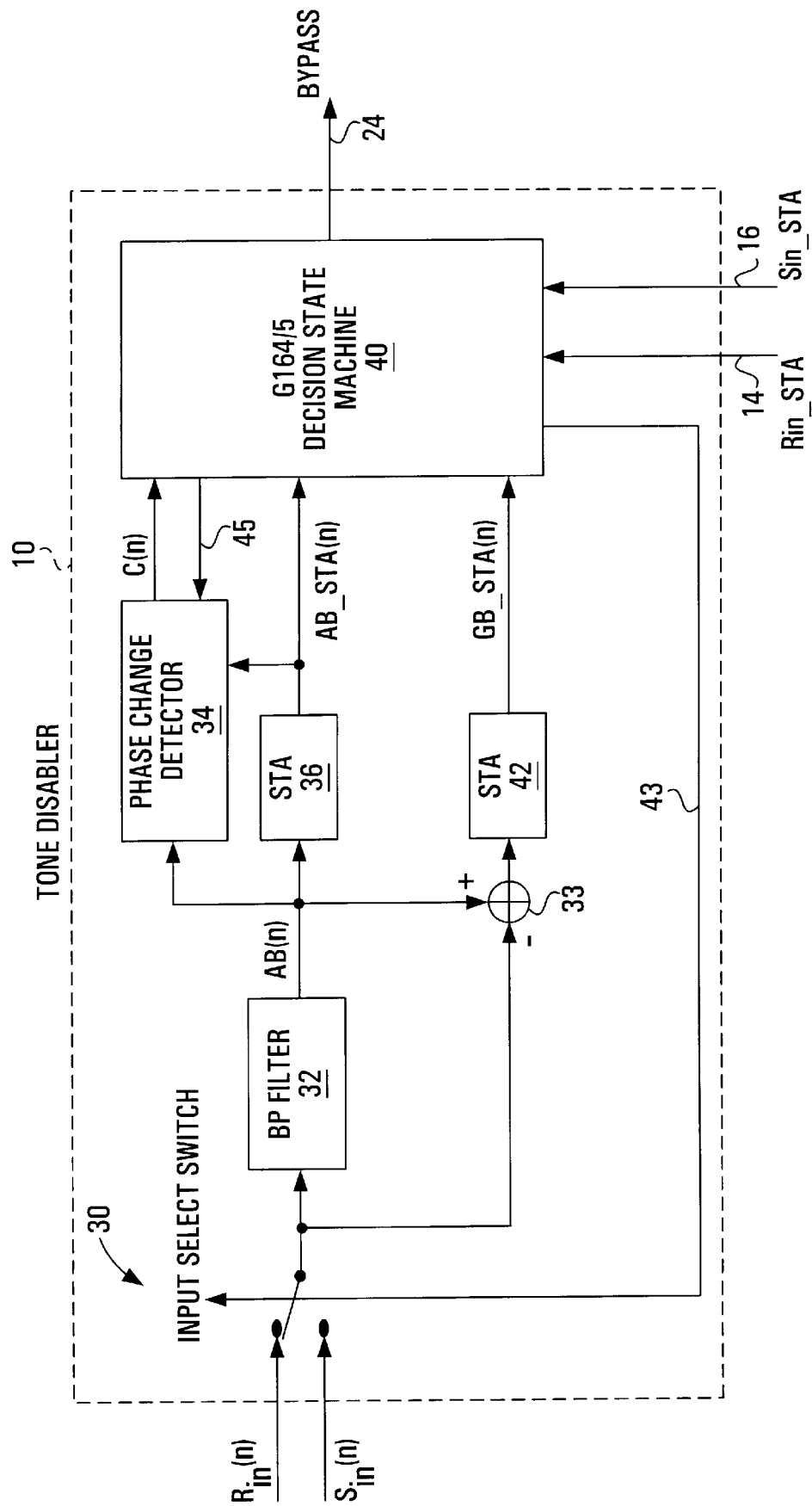
FIG. 2 is a detail schematic view of the tone disabler of FIG. 1.

The tone disabler 10 is detailed in FIG. 2. Turning to FIG. 2, disabler 10 comprises an alternating switch 30 for alternately sampling the send signal, $S_{in}$, and the receive signal, $R_{in}$. The output of the alternating switch inputs bandpass (BP) filter 32 and a subtracting input of adder 33. The accept band output of the bandpass filter (AB(n)) inputs a phase change detector 34 and a short term average (STA) circuit 36, as well as an adding input of adder 33. The phase change detector outputs a signal (C(n)) to a G.164/5 Decision State Machine 40. The STA circuit 36 outputs an accept band short term average signal (AB_STA(n)) to the Decision State Machine 40 and to the phase change detector 34. The adder 33 outputs to STA circuit 42 which, in turn, outputs a guard band short term average signal (GB_STA(N)) to the Decision State Machine. The Decision State Machine 40 outputs on aforenoted control line 24 and also outputs a control signal on line 43 to alternating switch 30 and a control signal on line 45 to the phase change detector 34.

Figure 3:
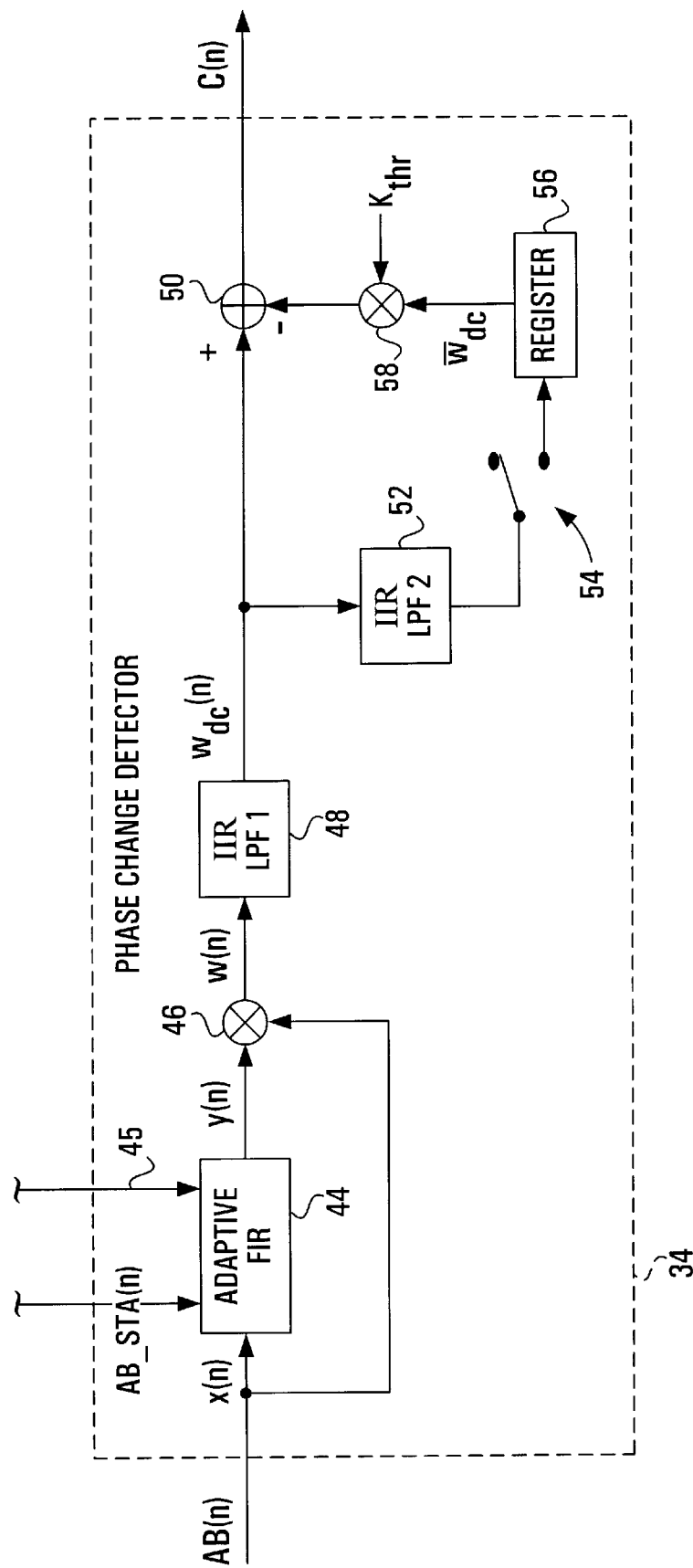
FIG. 3 is a detail schematic view of a portion of FIG. 2.

The phase change detector is detailed in FIG. 3. Turning to FIG. 3, the phase change detector comprises a buffered adaptive filter 44 input with the signal AB(n)—which signal is referred to as x(n) in the phase change detector—and outputting a signal (y(n)) to a multiplier 46. The adaptive filter is also input with the signal AB_STA(n) from STA circuit 36 (FIG. 2) and with control line 45 from the Decision State Machine 40 (FIG. 2). The signal x(n) also inputs the multiplier 46 directly. The multiplier outputs (signal w(n)) to a first low pass filter (LPF1) 48. The output $w_{dc}(n)$ of LPF1 inputs an adding input of an adder 50 and a second low pass filter (LPF2) 52. LPF2 outputs to an on-off switch 54; the switch outputs to a register 56 which, in turn, outputs to a multiplier 58. The multiplier 58 is also input with a threshold constant, $K_{thr}$. Multiplier 58 outputs to a subtracting input of adder 50. The output of the adder 50 is the output, c(n), of the phase change detector.

Figure 4:
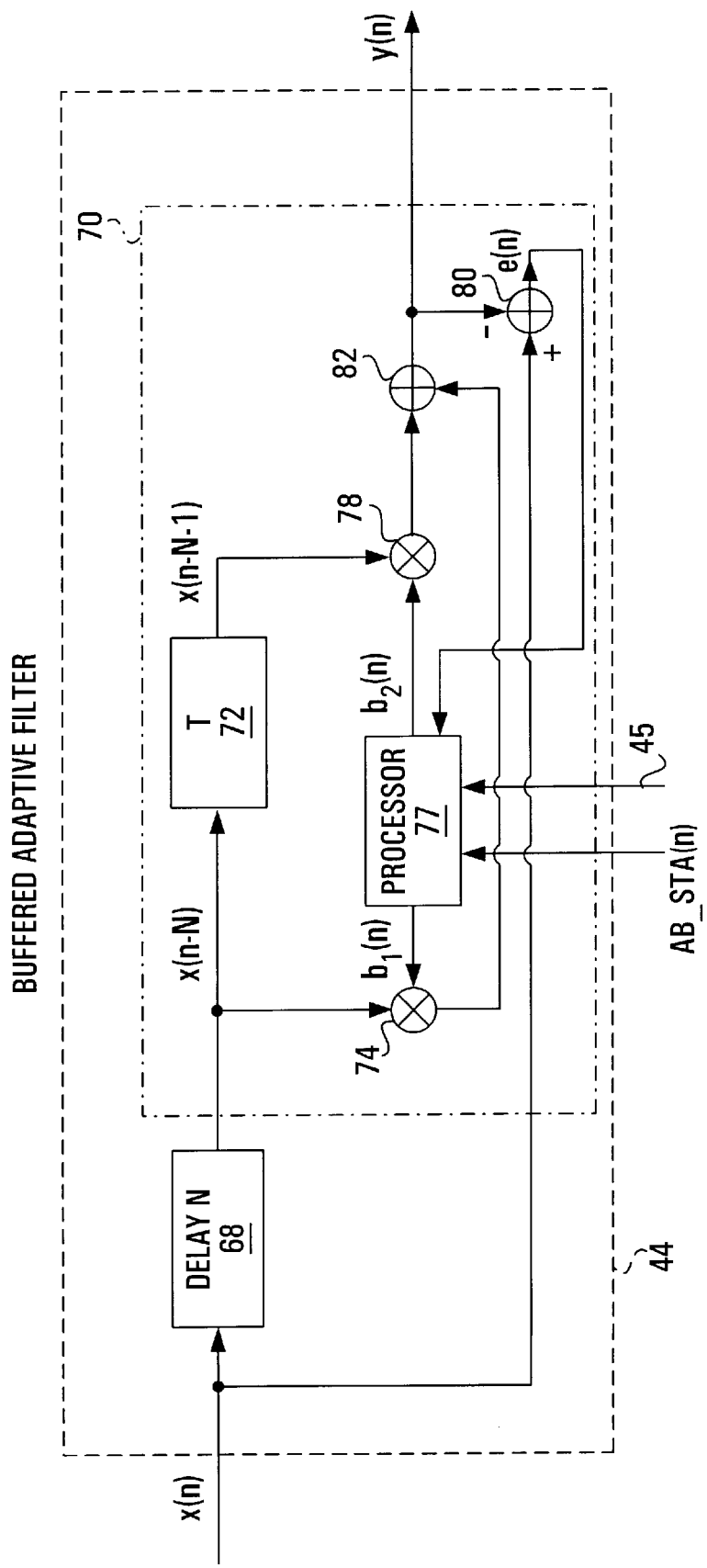
FIG. 4 is a detail schematic view of a portion of FIG. 3.

The buffered adaptive filter (adaptive predictor) is detailed in FIG. 4. Prior to considering the buffered adaptive filter in detail, it is first noted that the signals in the tone detector are digital, either because the telephone system is end-to-end digital, or because analog telephone signals have been converted to digital at the telephone switch. As is conventional, each digital signal is a sampled signal, sampled at a sample rate of 8 kHz. Turning now to FIG. 4, the sampled input signal, x(n), passes to a delay circuit 68 and to an adder 80. The delay circuit is a first in first out (FIFO) buffer for storing N consecutive signal samples. Preferably N is 256. The output of the FIFO buffer inputs adaptive filter core 70 comprising a one sample delay circuit 72, multiplier 74 and 78, and adders 80 and 82. The FIFO buffer and a co-efficient, $b_1(n)$ from processor 77, input multiplier 74. The one sample delay circuit and a second co-efficient, $b_2(n)$ from processor 77 input multiplier 78. Multipliers 74 and 78 output to adder 82. The adder 82 outputs to a subtracting input of adder 80 and to the output of the buffered adaptive filter. Processor 77 receives as inputs the signal AB_STA(n), a control signal on line 45, and a phase difference signal, e(n), from adder 80.

Referencing FIG. 2, in operation, switch 30 alternatively sends a signal from the near end and from the far end of the line to the bandpass filter (preferably switching once every 20 ms). Bandpass filter 32 passes a band in accordance with the G.164 standard (e.g., 2079 Hz to 2121 Hz). Decision State Machine 40 receives an indication of the power level of the pass band via STA circuit 36 and an indication of the power level of the guard band via adder 33 and STA circuit 42. Whenever these power levels meet the G.164 specification, the Decision State Machine 40 sends a signal on control line 43 and on control line 45. The signal on control line 43 freezes switch 30 so that this switch maintains its current setting until the output from the filter 32 is validated by the Decision State Machine as a G.164 tone (i.e., the power levels of the pass and guard bands continue to meet the G.164 levels for 300 +/−100 ms) and the Decision State Machine receives an indication G.165 validation has occurred (as will be described hereinafter) or until the output fails to be validated. The signal on control line 45 prompts processor 77 to begin generating co-efficients $b_1(n)$ and $b_2(n)$. On failing (G.164 or G.165) validation, the G.164/5 Decision State Machine Reverts to its initial state such that alternating selection resumes immediately. After G.164 and G.165 validation, the Decision State Machine sends a control signal on line 24 causing bypass switch 26 (FIG. 1) to bypass the echo canceller 12 (FIG. 1). The Decision State Machine then monitors lines 14 and 16 which indicate the energy at the near and far ends of the line. When these signals fall below a threshold, indicating that the trunk has gone silent at both the near end and far end, the Decision State Machine reverts to its initial state, releasing switch 24 (to re-introduce the echo canceller into the trunk) and switch 30 (to resume alternating selection).

The phase change detector 34 is instrumental in G.165 validation. Turning to FIGS. 3 and 4, the samples, x(n), of the signal are serially passed to the FIFO buffer 68 of the buffered adaptive filter 44 for temporary storage. The samples are shifted through the FIFO buffer at the sampling rate such that there is a time delay interval between the FIFO buffer input and its output equal to the number of samples, N, that it holds.

The processor 77, determines values for the co-efficients, $b_1(n)$ and $b_2(n)$, as follows. First an initial value of zero is specified for each of these co-efficients when the processor receives a signal on control line 45 from the Decision State Machine. The value of these co-efficients in subsequent sampling time intervals is calculated with the following equations:

$$b_1(n) = b_1(n-1) + g*e(n)*x(n-N)$$

$$b_2(n) = b_2(n-1) + g*e(n)*x(n-N-1)$$

where

N, as aforedescribed, is the time delay interval introduced by the FIFO buffer;

e(n) is a phase difference signal: e(n)=x(n)−y(n)

with x(n) being the sampled signal inputting the adaptive filter and y(n) being the sampled signal leaving the adapter;

g is a step size: $g = K_{step}/(xx\_AB_{13} STA)^2$ with K being a chosen constant and $(xx\_AB_{\_STA})^2$ being an estimate of the short term average energy in the incoming signal within the accept band of bandpass filter 32 (based on the input from STA circuit 36), which is $(ne\_AB_{\_STA})^2$ if alternating switch 30 is connected to the send signal, S, and $(fe\_AB_{\_STA})^2$ if alternating switch 30 is connected to the receive signal, R; and T (seen in FIG. 4) is one sample delay.

As will be apparent to those skilled in the art, the processor uses a normalized least mean squares approach to cause the co-efficients, $b_1(n)$ and $b_2(n)$, to iteratively converge on values whereat the phase difference signal, $e(n)$, between the non-delayed (input) tone $x(n)$ and the delayed (output) tone $y(n)$ goes to zero. With the phase difference signal at zero, the phase of the delayed tone, $y(n)$, is an integer multiple of $2\pi$ of the phase of the non-delayed tone, $x(n)$. The adaptive filter core effectively adds a fractional sample delay (a phase shift) to the N sample delay of the FIFO buffer and maintains unity gain in order to make the phase difference signal $e(n)$ go to zero. The frequency response to the adaptive filter is $$H(e^{j\Omega}) = b_1 + b_2 e^{-j\Omega}.$$

From this equation we can obtain the equation, $$\tan(\phi) = -b_2 \sin\Omega/(b_1 + b_2 \cos\Omega) = -r \sin\Omega/(1 + r \cos\Omega),$$

where $$r = b2/b1.$$

The equation shows that the phase shift $\phi$ is a function of the co-efficient ration, r. If the ratio r is chosen properly for a given tone (i.e. a signal having a constant frequency which frequency falls within a given range), a phase shift between $-180°$ and $+180°$ may be obtained.

Because the adaptive filter must have unity gain, $$|H(e^{j\Omega})|^2 = b_1^2 + b_1 b_2 \cos\Omega + b_1^2 = b_1(1 + r \cos\Omega + r^2) = 1,$$

the co-efficient $b_1^2 = 1/(1 + r \cos\Omega + r^2)$ and $b_2^2 = r/(1 + r \cos\Omega + r^2)$.

Therefore, the adaptive filter adjusts the phase difference between the non-delayed tone $x(n)$ and the delayed tone $y(n)$ so that the non-delayed tone $x(n)$ and the delayed tone $y(n)$ have same phase and same magnitude after the co-efficients of the filter have converged regardless of the phase difference that previously existed between the non-delayed and delayed tones.

As aforenoted, the Decision State Machine 40 validates a tone as a G.164 tone after 300 +/−100 ms. By this time, the co-efficients, $b_1(n)$ and $b_2(n)$, have converged. Upon G.164 validation, the Decision State Machine 40 sends a control signal on line 45 to the processor 77 causing it to suspend iterations thereby "freezing" the co-efficients at their current value such that the adaptive filter maintains the current fractional delay it has added regardless of any phase difference thereafter arising between the input signal, $x(n)$, and the output signal, $y(n)$.

Turning to FIG. 3, the output signal, $y(n)$, from the "frozen" buffered adaptive filter is multiplied by the input signal, $x(n)$ in multiplier 46 to produce a signal $w(n)$. Given that $x(n)$ has the form $A \cos(\Omega Tn + \theta_x)$ and $y(n)$ has the form $A \cos(\Omega Tn + \theta_y)$, the multiplied signal has the following form:

$$w(n) = A \cos(\Omega Tn + \theta_x) * A \cos(\Omega Tn + \theta_y) = 0.5A^2 \cos(2\Omega Tn - \theta_x - \theta_y) + 0.5A^2 \cos(\theta_x - \theta_y)$$

The signal $w(n)$ enters the low pass filter 48 which passes only the dc term, $w_{dc}(n)$, to its output:

$$w_{dc}(n) = 0.5 K_{LP} A^2 \cos(\theta_x - \theta_y)$$

where $K_{LP}$ is the gain constant of the low pass filter.

As long as there is no phase difference between $x(n)$ and $y(n)$, $\theta_x - \theta_y = 0$ and $w_{dc}(n) = 0.5 K_{LP} A^2$. On the other hand, once there is a phase reversal, $\theta_x - \theta_y = +/-180°$ and $w_{dc}(n) = -0.5 K_{LP} A^2$.

LPF2 52, switch 54, and register 56 co-operate to obtain a signal $\overline{w}_{dc}$. The signal $\overline{w}_{dc}$ is, at the time the filter co-efficients are frozen, equal to the constant $0.5 K_{kp} A^2$. The signal $\overline{w}_{dc}$ is multiplied by a constant $K_{thr}$ and input to the subtracting input of adder 50. The output signal $C(n)$ from adder 50 is as follows:

$$C(n) = w_{dc}(n) - K_{thr} \overline{w}_{dc}$$
$$= 0.5 K_{LP} A^2 \cos(\theta_x - \theta_y) - K_{thr} 0.5 K_{LP} A^2$$
$$= 0.5 K_{LP} A^2 [\cos(\theta_x - \theta_y) - K_{thr}].$$

A phase change is detected when $C(n)$ goes to less than zero. Otherwise, a phase change is not detected, when $C(n)$ is greater than zero or equal zero.

$K_{thr}$ controls the phase change deviation detected. For example, if we choose $K_{thr} = \cos(\pm 137°)$ then when a phase change, $\theta_x - \theta_y$, is greater than $137°$, $C(n) = 0.5 K_{LP} A^2 [\cos(\theta_x - \theta_y) - K_{thr}] = 0.5 K_{LP} A^2 [\cos(\theta_x - \theta_y) - \cos(\pm 137°)] = 0.5 K_{LP} A^2 [\cos(\theta_x - \theta_y) + 0.731]$ which will be less than zero and a phase change is detected. Otherwise, if the phase change, $\theta_x - \theta_y$, is not greater than $137°$, $C(n)$ will not be less than zero and a phase change will not be detected.

On a phase change occurring, $C(n)$ will maintain its value of $0.5 K_{LP} A^2 [\cos(\theta_x - \theta_y) - K_{thr}]$ which is less than zero until the phase change propagates through the FIFO buffer 48 and adaptive filter core 50. Since the FIFO buffer has 256 sample slots, given a sampling rate of 8000 samples per second, this means $C(n)$ maintains its value of $0.5 K_{LP} A^2 [\cos(\theta_x - \theta_y) - K_{thr}] < 0$ for thirty-two ms.

Whenever the G.164/5 Decision State Machine reverts to its initial state (which occurs when G.164 or G.165 validation fails and after the trunk has gone silent at both the near end and far end), the tone disabler then again monitors for a tone meeting G.164 and G.165 standards. In this regard, the filter co-efficients may remain "frozen" until the Decision State Machine again detects that the signal power levels meet the G.164 specification whereupon a control signal is sent on line 45 prompting processor 77 to reset these co-efficients to zero. The process then proceeds as aforedescribed.

Because the adaptive filter core 70 may vary the phase of the input tone signal by up to one cycle (i.e., $2\pi$), it may compensate for any phase difference between the input tone signal and the output tone signal. This suggests the FIFO buffer could be any arbitrary fixed length to introduce any phase difference between the input and the output signals. However, the system must still recognize a phase reversal. Theoretically, after the co-efficients of the core 70 are frozen, a phase reversal could be recognized even with a very short or non-existent FIFO buffer 68. However with a short FIFO buffer, the phase reversal would propagate through the frozen buffered adaptive filter so quickly that there may be insufficient time to recognize it. The FIFO buffer increases by N times the sample rate (i.e., N * 125 $\mu s$ for a sampling rate of 8 kHz) the time for propagation of the phase reversal through the buffered adaptive filter. This then provides recognition time for phase reversal. The length of the FIFO buffer is therefore dependent on the speed at which a system may recognize a phase reversal.

A number of other modifications will be apparent. While it is preferred that two phase changes are detected before by-passing the echo canceller, the Decision State Machine 40 could be modified to by-pass the echo canceller after a single phase change is detected.

While the tone detector of this invention has been described for use with an echo canceller, it would also have application to any situation wherein it is useful to determine a phase change in a tone (i.e., a constant single frequency signal). What is important is that the buffered adaptive filter be able to vary the phase of the output tone by up to one cycle which, as aforenoted, requires a suitable choice for the co-efficient ratio, r.

Other modifications will be apparent to those skilled in the art and, therefore, the invention is defined in the claims.

What is claimed is:

1. A method for determining a phase change in a sampled tone, comprising:

delaying an input sampled tone by a fixed amount to obtain a delayed sampled tone;

inputting said input sampled tone and said delayed sampled tone to an adaptive filter and adjusting co-efficients of said adaptive filter to obtain an output sampled tone having a varying delay with respect to said input sampled tone until a phase of said output sampled tone is an exact integer multiple of $2\pi$ of said input sampled tone;

when said phase of said output sampled tone is an exact integer multiple of $2\pi$ of said input sampled tone, fixing said co-efficients regardless of any phase difference thereafter arising between said input sampled tone and said output sampled top; and thereafter monitoring said input sampled tone and said output sampled tone for a phase difference arising between said input sampled tone and said output sampled tone, said arising phase difference indicating a phase change in said sampled tone.

2. The method of claim 1 wherein said monitoring comprises obtaining a signal which is a product of said input sampled tone and said output sampled tone and examining the level of a zero frequency component of said product signal.

3. The method of claim 2 further comprising detecting said tone and wherein said co-efficients are not fixed until said tone is detected.

4. The method of claim 1 wherein said sampled tone has a frequency within the range of 1900 Hz and 2350 Hz and said adjusting consists of adjusting two co-efficients of said adaptive filter.

5. Apparatus for determining a phase change in a sampled tone, comprising:

a fixed length first in first out (FIFO) buffer input by said sampled tone for temporarily storing a plurality of sampled signals on a FIFO basis and presenting a delayed sampled tone at a FIFO buffer output;

an adaptive filter input by said FIFO buffer output and by said input sampled tone for introducing a variable delay in said delayed sampled tone and presenting an output sampled tone at an adaptive filter output until a phase difference between said input sampled tone and said output of said adaptive filter is an integer multiple of $2\pi$;

a filter freezer for, after said phase difference becomes an integer multiple of $2\pi$, freezing said adaptive filter such that said adaptive filter maintains a fixed delay regardless of any phase difference thereafter arising between said input sampled tone and said output of said adaptive filter; and a monitor for monitoring said input sampled tone and said output of said frozen adaptive filter for a phase difference arising between said input sampled tone and said output of said frozen adaptive filter, said arising phase difference indicating a phase change in said sampled tone.

6. The apparatus of claim 5 wherein said adaptive filter has a processor which varies co-efficients to converge on a delay whereat a phase difference between said input sampled tone and said output of said adaptive filter is an integer multiple of $2\pi$ and wherein said filter freezer freezes said adaptive filter by freezing said co-efficients.

7. The apparatus of claim 6 wherein said monitor comprises a multiplier for multiplying said input sampled tone with the output of said adaptive filter and a low pass filter for filtering an output of said multiplier.

8. The apparatus of claim 5 wherein said filter freezer comprises a detector for detecting said tone such that said filter freezer is not operative until after said detector detects said tone.

9. The apparatus of claim 6 wherein said sampled tone has a frequency of between 1900 Hz and 2350 Hz and said adaptive filter has exactly two co-efficients.

10. An echo canceller assembly comprising:

an echo canceller for receiving a sampled signal from a far end of a communications link and for sending a sampled signal from a near end of said communications link after cancelling echo components from said near end signal;

a by-pass switch for by-passing said echo canceller;

an echo canceller disabler comprising:

an alternating switch for switching between said sampled far end signal and said sampled near end signal;

a state machine for sensing when a power level of a signal output from said alternating switch in a frequency band exceeds a threshold thereby indicating a tone of some frequency within said frequency band and for disabling said alternating switch while said power level in said frequency band exceeds said threshold;

a phase change detector comprising:
          a fixed length first in first out (FIFO) buffer input by input signal samples output by said alternating switch for temporarily storing a plurality of sampled signals on a FIFO basis and presenting a delayed sampled signal at a FIFO buffer output;

an adaptive filter input by said FIFO buffer output and by said input signal samples for introducing a variable delay in said delayed sampled signal and presenting an output sampled signal at an adaptive filter output until a phase difference between said input sampled signal and said output of said adaptive filter is an integer multiple of $2\pi$;

said state machine for, after said phase difference becomes an integer multiple of $2\pi$, freezing said adaptive filter such that said adaptive filter maintains a fixed delay regardless of any phase difference thereafter arising between said input sampled signal and said output of said frozen adaptive filter and for monitoring said input sampled signal and said output of said frozen adaptive filter for a phase difference arising between said input sampled tone and said output of said frozen adaptive filter, and, on sensing a phase difference indicating a phase change in said input sampled signal, causing said by-pass switch to by-pass said echo canceller.

11. An echo canceller disabler, comprising:

an alternating switch for switching between a sampled far end signal on a communications link and a sampled near end signal on said communications link;

a state machine for sensing when a power level of a signal output from said alternating switch in a frequency band exceeds a threshold thereby indicating a tone of some frequency within said frequency band and for disabling said alternating switch while said power level in said frequency band exceeds said threshold;

a phase change detector comprising:

a fixed length first in first out (FIFO) buffer input by input signal samples output by said alternating switch for temporarily storing a plurality of sampled signals on a FIFO basis and presenting a delayed sampled signal at a FIFO buffer output;

an adaptive filter input by said FIFO buffer output and by said input signal samples for introducing a variable delay in said delayed sampled signal and presenting an output sampled signal at an adaptive filter output until a phase difference between said input sampled signal and said output of said adaptive filter is an integer multiple of $2\pi$;

said state machine for, after said phase difference becomes an integer multiple of $2\pi$, freezing said adaptive filter such that said adaptive filter maintains a fixed delay regardless of any phase difference thereafter arising between said input sampled signal and said output of said frozen adaptive filter and for monitoring said input sampled signal and said output of said frozen adaptive filter for a phase difference arising between said input sampled tone and said output of said frozen adaptive filter, and, on sensing a phase difference indicating a phase change in said input sampled signal, sending an echo canceller disabling indication.

12. A method for disabling an echo canceller, comprising:

delaying an input sampled signal by a fixed amount to obtain a delayed sampled signal;

while a power level of said input sampled signal indicates a tone, inputting said input sampled tone and said delayed sampled signal to an adaptive filter and adjusting co-efficients of said adaptive filter to obtain an output sampled signal having a varying delay with respect to said input sampled signal until a phase of said output sampled signal is an integer multiple of $2\pi$ of said input sampled signal;

when said phase of said output sampled signal is an integer multiple of $2\pi$ of said input sampled signal, fixing said co-efficients regardless of any phase difference thereafter arising between said input sampled signal and said output sampled signal;

thereafter monitoring said input sampled signal and said output sampled signal for a phase difference arising between said input sampled signal and said output sampled signal, said arising phase difference indicating a phase change in said sampled signal; and generating a disabling indication to disable an echo canceller on an arising phase difference between said input sampled signal and said output sampled signal.

13. A method for determining a phase change in a sampled tone of unknown frequency, comprising:

inputting said sampled tone to an adaptive filter and adjusting co-efficients of said adaptive filter based on tone samples delayed by at least a fixed number of samples with respect to said sampled tone and based on said input sampled tone to obtain an output sampled tone having a varying delay with respect to said input sampled tone until said output sampled tone is in phase with said input sampled tone;

when said output sampled tone is in phase with said input sampled tone, fixing said co-efficients regardless of any phase difference thereafter arising between said input sampled tone and said output sampled tone; and thereafter monitoring said input sampled tone and said output sampled tone for a phase difference arising between said input sampled tone and said output sampled tone, said arising phase difference indicating a phase change in said sampled tone.

14. A method for determining a phase change in a sampled tone of unknown frequency, comprising:

inputting said sampled tone to an adaptive predictor and adjusting co-efficients of said adaptive predictor to obtain an output sampled tone having a varying delay with respect to said input sampled tone until said output sampled tone is in phase with said input sampled tone;

when said output sampled tone is in phase with said input sampled tone, fixing said co-efficients regardless of any phase difference thereafter arising between said input sampled tone and said output sampled tone; and thereafter monitoring said input sampled tone and said output sampled tone for a phase difference arising between said input sampled tone and said output sampled tone, said arising phase difference indicating a phase change in said sampled tone.

* * * * *

UNITED STATES PATENT AND TRADEMARK OFFICE
CERTIFICATE OF CORRECTION

PATENT NO. : 6,055,310
DATED : April 25, 2000
INVENTOR(S) : Naigang Zhang

It is certified that error appears in the above-identified patent and that said Letters Patent are hereby corrected as shown below:

Column 7, Line 35, replace "said output sampled top; and" with --said output sampled tone; and--.

Signed and Sealed this

Fifteenth Day of May, 2001

Attest:

NICHOLAS P. GODICI

*Attesting Officer*         *Acting Director of the United States Patent and Trademark Office*